United States Patent [19]

Creekmore et al.

[11] 4,072,790
[45] Feb. 7, 1978

[54] EXTRUDABLE COMPOUNDED POLYVINYL CHLORIDE

[75] Inventors: Mark D. Creekmore, Akron; Edward T. Vielhaber, Cuyahoga Falls; Russell P. Carter, Jr., Stow, all of Ohio

[73] Assignee: The Goodyear Tire & Rubber Company, Akron, Ohio

[21] Appl. No.: 696,678

[22] Filed: June 16, 1976

Related U.S. Application Data

[63] Continuation of Ser. No. 533,583, Dec. 17, 1974, abandoned.

[51] Int. Cl.$^2$ ............................................ B32B 27/18
[52] U.S. Cl. ................................ 428/220; 260/18 EP; 260/23 XA; 260/28.5 D; 260/30.6 R; 260/31.2 R; 260/31.6; 260/31.8 R
[58] Field of Search ............... 260/29.6, 23 XA, 42.44, 260/31.8 R; 252/20; 428/220

[56] References Cited

U.S. PATENT DOCUMENTS

| | | | |
|---|---|---|---|
| 3,451,960 | 6/1969 | Schmidt | 260/29.6 |
| 3,931,076 | 1/1976 | Rubin | 260/23 XA |

*Primary Examiner*—Lewis T. Jacobs
*Attorney, Agent, or Firm*—F. W. Brunner; H. C. Young, Jr.

[57] ABSTRACT

An extrudable compounded polyvinyl chloride and a method for its preparation which comprises a free-flowing particulate mixture of polyvinyl chloride, selected plasticizer, silica pigment, selected heat stabilizer, selected chelator, lubricant, selected surfactant and selected slip-antiblock agent. The compounded polyvinyl chloride uniquely has, as an extruded film, anti-moisture fogging and oxygen transmissive properties suitable for packaging meat, yet can be used in high speed packaging machines.

7 Claims, No Drawings

EXTRUDABLE COMPOUNDED POLYVINYL CHLORIDE

This is a continuation of application Ser. No. 533,583 filed Dec. 17, 1974, now abandoned.

This invention relates to a compounded polyvinyl chloride. More particularly, the invention relates to a compounded polyvinyl chloride film which can be prepared by extrusion and suitably used in an automated packaging process.

Cast polyvinyl chloride films have been widely used for packaging various materials including meat products. Such films when properly compounded with additional materials can provide meat packaging films with sufficient film surface moisture antifogging properties that their internal surfaces do not become fogged at normal refrigeration temperatures and also a sufficient oxygen permeability so the hemoglobin of mean can oxidize to allow the meat to maintain its red color. However, inherent difficulties can occur when it is desired to extrude such compounded polyvinyl chloride films and use such extruded films for packaging various materials such as meat products on a mass production basis utilizing high speed machines. Typically the reject rate of compounded polymer film after extrusion and reject rate of packages and machine down time during high speed machine packaging has been excessively large from the high frequency of torn film or jammed machines.

It has been discovered that the cause of the torn film or jammed machine in the high speed packaging operation is apparently due primarily to undesirable film surface phenomena causing it to excessively adhere to portions of the machinery or to itself. Although such film surface phenomena are not thoroughly understood, it is believed to potentially involve friction forces such as drag and adhesion as well as static charge and attractional forces. Even when suitable compounding is provided to counteract such film surface phenomena, inherent difficulties have still been incurred with efforts to successively extrude such film.

Therefore, it is an object of this invention to provide a compounded polyvinyl chloride suitable for use as a packaging film having acceptable film surface moisture antifogging and oxygen permeability yet which can be utilized in a high speed machine packaging operation and yet which can be successfully prepared by extrusion.

In accordance with this invention, it has been discovered that an extrudable compounded polyvinyl chloride is prepared by the method which comprises dry blending to a free flowing granular mixture 100 parts by weight particulate polyvinyl chloride resin, from about 20 to about 32 parts by weight of at least one plasticizer selected from at least one of di(2-ethylhexyl)adipate, epoxidized soyabean oil, epoxidized linseed oil, acetyltributylcitrate, butylbenzylphthalate, dibutyl sebacate, butylstearate, acetyl triethyl citrate, p-tert-butylphenyl salicylate, butylphthalyl butyl glycolate, di-(2-ethylhexyl)phthalate, diethyl phthalate, diisobutyl adipate, diisooctyl phthalate, diphenyl-2-ethylhexyl phosphate, ethylphthalyl ethyl glycolate, glycerol monooleate, monoisopropyl citrate, mono-, di- and tristearyl citrate, triacetin(glycerol triacetate), triethyl citrate, 3-(2-xenoyl)-1,2-epoxypropane, 1,3-butylene glycole adipic acid polyester of about 1700 to about 2200 molecular weight terminated with at least one organic acid selected from myristic, palmitic and stearic acids, dicyclohexyl phthalate, di(2-ethylhexyl)-azelate, di-n-hexyl azelate, dihexyl phthalate, diphenyl phthalate, epoxidized butyl esters of linseed oil fatty acids, diisononyl adipate and diisononyl phthalate, from about 0.1 to about 2.5, preferably about 0.2 to about 2.0, parts by weight of a pigment having an average particle size in the range of about 1 to about 10, including about 2 to about 10, microns selected from pigments comprised of about 50 to about 100, preferably about 95 to about 100, weight percent silica ($SiO_2$), and correspondingly about 0 to about 50, preferably about 0 to about 5, weight percent other oxides selected from aluminum, magnesium, calcium, iron, potassium and sodium, from about 0.75 to about 7, preferably about 1.0 to about 3.0, parts by weight of a heat stabilizer selected from stannous stearate, magnesium stearate and a mixture comprising zinc stearate and calcium stearate in a zinc to calcium weight ratio of about 1:1 to about 3.9:1, preferably about 3:1 to about 3.7:1, from about 0.25 to about 2.5, preferably about 1.2 to about 1.8 parts by weight of tris-nonylphenyl phosphite as a chelator, from about 0.2 to about 1.5, preferably about 0.7 to about 1.3, parts by weight of a lubricant from alcohol esters, amide waxes, fatty acids, fatty acid esters, fatty alcohols, glycerol esters, glycol esters, metallic stearates and ricinoleates, paraffin waxes, synthetic waxes, polyethylene waxes, modified polyethylene waxes, vinyl ethers, triglycerides, wax acid, and wax esters; from about 2 to about 9, preferably about 3 to about 8, parts by weight of at least one surfactant selected from: polyoxyethylene(20)sorbitan monooleate, the mono and diglycerides of fat-forming fatty acids, a nonylphenoxy polyoxyethylene ethanol containing 4 to 5 moles of ethoxylate, glycerol monoolate, sorbitan monooleate, polyoxyethylene(9-)monooleate, α-alkyl-, α-alkenyl and α-alkylaryl-omega-hydroxypoly(oxyethylene) comprised of at least one of α-(2,4,6-triisobutylphenyl)-omega-hydroxypoly(oxyethylene), α-(Z)-9-octadecenyl-omega-hydroxypoly(oxyethylene), and α-alkyl($C_{16}$–$C_{18}$)-omega-hydroxypoly(oxyethylene), α-alkyl-omega-hydroxypoly(oxyethylene derived from ethylene oxide and $C_{11}$–$C_{15}$ straight chain secondary alcohols, n-alkylsulfonate where said alkyl group has 10–18 carbon atoms, α-di-sec-butylphenyl-omega-hydroxypoly(oxyethylene) derived from ethylene oxide and di-sec-butylphenol, α-dodecyl-omega-hydroxy-poly(oxyethylene) mixture of dihydrogen phosphate and monohydrogen phosphate esters derived by esterification of the product of ethylene oxide and n-dodecyl alcohol, α-(p-dodecylphenyl)-omega-hydroxypoly(oxyethylene) derived from ethylene oxide and dodecylphenol, α-(p-nonylphenyl)-omega-hydroxypoly(oxyethylene) mixture of dihydrogen phosphate and monohydrogen phosphate esters derived from esterification of α-(p-nonylphenyl)-omega-hydroxypoly(oxyethylene), α-(p-nonylphenyl)-omega-hydroxypoly(oxyethylene) derived from condensation of nonylphenol and ethylene oxide, α-(p-nonylphenyl)-omega-hydroxypoly(oxyethylene)-sulfate, ammonium and sodium salts where said nonyl group is a propylene trimer isomer and said poly(oxyethylene) content averages about 4 moles, poly(oxypropylene) block polymer with poly(oxyethylene) having an average molecular weight of about 11,000 to about 18,000, polyoxyethylene(20)sorbitan monostearate, polyoxyethylene(20)sorbitan tristearate, polyoxyethylene(20) sorbitan monooleate, polyoxyethylene(20-)sorbitan trioleate, sodium n-alkylbenzenesulfonate where said alkyl group contains an average of about 10 to about 16 carbon atoms, sorbitan monopalmitate, sorbitan monostearate, sorbitan trioleate, sorbitan tristearate, α-[p-(1,1,3,3-tetramethylbutyl)phenyl]-omega-hydroxypoly(oxyethylene) derived from ethylene oxide and p-(1,1,3,3-tetramethylbutyl)phenol, tetrasodium N-(1,2-dicarboxyethyl)-N-octadecyl-sulfosuccinamate, and α-tridecyl-omega-hydroxypoly(oxyethylene) mixture of dihydrogen phosphate and monohydrogen phosphate esters derived from esterification of the product of ethylene oxide and tridecyl alcohol, and from about 0.1 to about 0.6, preferably about 0.15 to about 0.5, parts by weight of a slip-antiblock agent selected from at least one of the group consisting of ethylene-N,N'-bis-oleamide, hydrofol glyceride, hydrogenated fish oil, calcium ricinoleate and fatty acid amides selected from amides with aliphatic hydrocarbon chains containing in the range of about 16 to 40, preferably 18 to 34, even numbered carbon atoms, said hydrocarbon chains being saturated or partly unsaturated with 1 to 2, preferably 1, carbon-to-carbon double bonds of unsaturation.

It should be recognized that a number of the ingredients can be used somewhat interchangeably for various functions such as, for example, in the instance of heat stabilizers, lubricants and slip-antiblock agents.

It should further be appreciated that the invention is based primarily on the manipulation of choice of materials and the manipulation of dry blending coupled with subjecting the compounded polyvinyl chloride to a combination of the high shear and heat of extrusion yet which results in a film suitable for meat packaging.

A film suitable for meat packaging having a thickness in the range of about 0.5 to about 4.5 mils is prepared by extruding the compounded polyvinyl chloride as a melt through a die having a temperature in the range of about 170° C to about 220° C. It should be understood, for this extrusion purpose, that said free-flowing compounded polyvinyl chloride can be submitted to an intermediate pelletizing or melt step prior to extrusion so that it is not actually free-flowing when charged to the extruder.

Representative of various lubricants are paraffin hydrocarbons such as paraffin oils having a solidification point in the range of about 50° C to about 70° C, natural paraffins having a solidification point in the range of about 50° C to about 70° C, and synthetic paraffins having a solidification point in the range of about 50° C to about 100° C. Representative of various fatty acids are palmitic acid, stearic acid, arachidic acid, behenic acid, hydroxystearic acid, tallow and fish oil fatty acids, generally of the palmittic/stearic acid mixture-type. Representative of various fatty alcohols are palmityl alcohol and stearyl alcohol. Representative of various fatty acid derivatives (metal soaps) are neutral lead stearate, calcium stearate, zinc stearate, tin-II-ricinoleate and tin-II-octoate. Representative of various wax esters are cetyl palmitate, myricyl palmitate, and stearyl stearate. Representative of various fatty acid esters are ethyl stearate, n-butyl stearate and n-octyl stearate. Representative of various partial esters are glyceryl monostearate, glyceryl monooleate, glyceryl monoricinoleate, acetylglyceryl monoricinoleate, acetylglyceryl monostearate, and diethylene glycol monolaurate. Representative of various triglycerides are glycerine tripalmitate, glyceryl tristearate and glyceryl tri-12-hydroxystearate. Representative of various fatty acid amides are stearamide and ethylene diamine distearate.

Particularly useful lubricants are alcohol esters such as palmityl and stearyl esters of oleic, caprylic, lauric, palmitic, stearic, myristic acids; amide waxes such as behenamide, stearamide, oleamide, erucamide; fatty acids such as stearic acid, palmitic acid, tallow or fish oil acids, lauric acid, caprylic acid, myristic acid, ricinoleic acid, hydroxystearic acid, behenic acid, arachidic acid; metal soaps such as lead, calcium, zinc stearates, tin octoates; and polyethylene waxes and modified polyethylene waxes.

The compounded polyvinyl chloride film of this invention can be generally characterized when having a thickness of about 0.7 mils by an Elmendorf tear resistance in the range of about 20 to about 200 grams/mil according to ASTM No. D-1922-61T, a coefficient of friction (film against metal) of about 0.2 to about 2.0 according to ASTM No. D-1894-63, a water vapor transmission rate (WVTR) at 37.8° C and a relative humidity of about 90 percent in the range of about 15 to about 50g/100 in $^2$/24 hrs according to ASTM No. E-96-66, Method E, and an oxygen transmission of about 350 to about 1200 cc/100 in $^2$/24 hrs/1 atm according to ASTM No. D-1434-63.

In the practice of this invention, it was discovered that a polyvinyl chloride film compounded in this manner not only provides a packaging film having a substantially reduced and practically nonexistant rejection rate due to poor film feeding in a high speed packaging machine operation, but can be prepared by extrusion without degrading this important property.

Various polyvinyl chlorides can be used including those prepared by solution polymerization, suspension polymerization and bulk polymerization. They typically have a particle size range from about 75 to about 200 microns with an inherent viscosity in the range of about 0.5 to about 1.4 as determined in cyclohexanone according to ASTM No. D-1243-66. They can have an apparent bulk density in the range of about 9 to about 51 pounds per cubic feet, a compact density in the range of about 15 to about 55 pounds per cubic feet and a specific gravity in the range of about 1.3 to about 1.5.

In the further practice of this invention, it is preferred that the polyvinyl chloride resin be compounded with a plasticizer selected from a least one of di(2-ethylhexyl)adipate, di(2-ethylhexyl)azelate, di(n-hexyl)azelate, and at least one of epoxidized linseed oil and epoxidized soyabean oil; a silica pigment having a silica content of at least about 98 weight percent $SiO_2$; a stabilizer as a mixture of zinc stearate and calcium stearate; tris-nonylphenyl phosphite chelator; a surfactant mixture of polyoxyethylene(9) monooleate and glycerol mono fatty acid ester; and ethylene-N,N'-bis-oleamide as a slip-antiblocking agent and a lubricant system selected from stearic acid, low molecular weight polyethylene or partially oxidized low molecular weight polyethylene. It is particularly preferred that the weight ratio of ethylene-N,N'-bis-oleamide to plasticizer is less than about 0.017.

The various epoxidized oils are oils to which oxygen has been added to some of their chemical points of unsaturation. The resulting structure has been called an oxirane oxygen. Typically, the epoxidized linseed and soyabean oils are characterized by containing about 4 to about 10, preferably about 7 to about 9.5, weight percent oxirane oxygen. Certainly, it is well known that the linseed and soyabean oils are comprised primarily of complex mixtures of saturated and mostly unsaturated triglycerides.

Various surfactants selected from mono and diglycerides of fat-forming fatty acids can be used. Representative of such fat-forming fatty acids are those having about 10 or 12 to about 20 carbon atoms such as lauric, palmitic, stearic, oleic, linoleic and linolenic acids. If the preferable mixture of nonylphenoxy polyoxyethylene ethanol, polyoxyethylene(9) monooleate and said glycerides of fat-forming fatty acids is used, particularly desirable results can be achieved if a maximum of about 3.5 parts by weight per 100 parts polyvinyl chloride of the total of said monooleate and said fatty acid is used with the remainder of the surfactant comprising said ethanol compound.

Ethylene-N,N'-bis-oleamide is the preferred material for the slip-antiblock agent. However, of the various fatty acid amides for this purpose, representative examples are $C_{18}$ saturated stearamide, $C_{18}$ unsaturated oleamide, $C_{40}$ saturated fatty acid amide, $C_{22}$ saturated behenamide and $C_{34}$ saturated fatty acid amide, $C_{22}$ unsaturated erucamide, $C_{16}$ unsaturated fatty acid amide, $C_{12}$ saturated lauramide and $C_{16}$ saturated palmitamide.

The practice of this invention is further illustrated by reference to the following examples which are intended to be representative rather than restrictive of the scope of the invention. Unless otherwise indicated, all parts and percentages are by weight.

EXAMPLE I

To a Henschel mixer (Model No 115 SS obtained from Prodex Corporation) was charged particulate polyvinyl chloride along with plasticizer, heat stabilizer, chelator, lubricant, surfactant, silica, and slip-antiblock agent. The mixture was stirred in the mixer for about 8 to 11 minutes until a free flowing granular, or particulate, mixture was obtained. The recipe for the mixture is more clearly shown in the following Table 1.

TABLE 1

| Compound | Parts |
|---|---|
| Polyvinyl chloride particulate resin | 100 |
| Epoxidized soyabean oil | 4 |
| dioctyl-adipate | 24 |
| zinc stearate and calcium stearate in a weight ratio of 3/1 to about 3.7/1 blended with an epoxidized soyabean oil in 1/2 weight ratio | 2 |
| tris-nonylphenyl phosphite | 1.5 |
| glycerol mono fatty acid ester | 3 |
| polyoxyethylene(9)monooleate non-ionic surfactant | 2 |
| silica ($SiO_2$) with an average particle size of about 2-4 microns | .925 |
| ethylene-N,N'-bis-oleamide | .40 |
| polyethylene (low molecular weight) | 0.38 |
| stearic acid | 0.48 |
| TOTAL | 138.685 |

The free flowing dry blend was then charged to pelletizer in which the material was extruded and diced into ¼ inch cubes. The cubes were then melted and extruded at a temperature of about 170° C to about 220° C through a suitable die under a pressure of about 1800 to about 2600 psig to form a film having a thickness in the range of about 0.5 to about 4.5 mils.

A suitable melt temperature for the compounded polyvinyl chloride of this invention is generally in the range of about 170° C to about 200° C. A film prepared according to this Example having a thickness of 0.7 mils was submitted to tests, the results shown in Example II.

EXAMPLE II

The film produced according to Example I was submitted to testing. The following results shown in Table 2 are exemplary.

TABLE 2

| Test | Units | Results |
|---|---|---|
| Ultimate tensile | psi | 10,300 MD* |
| | | 5,170 TD** |
| Ultimate elongation | % | 180 MD |
| | | 360 TD |
| Elmendorf tear | gm/mil | 125 MD |
| | | 105 TD |
| Graves tear | gm/mil | 120 MD |
| | | 215 TD |
| MVTR*** | gm/100 in$^2$/24 hr | 21 |
| Gas transmission | cm$^3$/100 in$^2$/24 hr | 450 $O_2$ |
| | | 3633 $CO_2$ |
| Light transmission | % | 91.5 |
| Haze | % | 1.8 |
| Specific gravity | | 1.26 |
| Heat seal | ° F | 370° |
| Anti-fog | minutes | 0.5 |

*Machine Direction (measurement taken in longitudinal direction of film)
**Transverse Direction (measurement taken 90° from Machine Direction)
***Moisture Vapor Transmission Rate While certain representative embodiments and details have been shown for the purpose of illustrating this invention, it will be apparent to those having skill in this art that various changes and modifications may be made therein without departing from the spirit or scope of the invention.

What is claimed is:

1. An extruded compounded polyvinyl chloride film having a thickness in the range of about 0.5 to about 4.5 mils prepared by the method which comprises (A) dry blending materials to a free flowing granular mixture, (B) pelletizing said mixture and (C) extruding said pelletized mixture, as a melt, through a die having a temperature in the range of about 170° C. to about 220° C., said dry blend materials comprising (1) 100 parts by weight particulate polyvinyl chloride resin, about 20 to 32 parts by weight of at least one plasticizer selected from at least one of di(2-ethylhexyl) adipate, epoxidized soyabean oil, epoxidized linseed oil, acetyl tributylcitrate, butylbenzylphthalate, dibutyl sebacate, butyl stearate, acetyl triethyl citrate, p-tert-butyl-phenyl salicylate, butylphthalyl butyl glycolate, di-(2-ethylhexyl)phthalate, diethyl phthalate, diisobutyl adipate, diisooctyl phthalate, dipehenyl-2-ethylhexyl phosphate, ethylphthalyl ethyl glycolate, glycerol monooleate, monoisopropyl citrate, mono-, di- and tristearyl citrate, triacetin (glycerol triacetate), triethyl citrate, 3-(2-xenoyl)-1,2-epoxypropane, 1,3-butylene glycol adipic acid polyester of about 1700 to about 2200 molecular weight terminated with at least one organic acid selected from myristic, palmitic and stearic acids, dicyclohexyl phthalate, di(2-ethylhexyl)-azelate, di-n-hexyl azelate, dihexyl phthalate, diphenyl phthalate, epoxidized butyl esters of linseed oil fatty acids, diisononyl adipate and iisononyl phthalate, (2) from about 0.1 to about 2.5 parts by weight of a pigment having an average particle size in the range of about 2 to about 10 microns selected from pigments comprised of about 50 to about 100 weight percent silica ($SiO_2$), and corresponding from none to about 50 weight percent other oxides selected from aluminum, magnesium, calcium, iron, potassium and sodium, (3) from about 0.75 to about 7 parts by weight of a heat stabilizer selected from stannous stearate, magnesium stearate and a mixture comprising zinc stearate and calcium stearate in a zinc to calcium weight ratio of about 1:1 to about 3.9:1, (4) from about 0.25 to about 2.5 parts by weight of tris-nonylphenyl phosphite as the chelator, (5) from about 0.2 to about 1.5 parts by weight of a lubricant selected from alcohol esters, amide waxes, fatty acids fatty acid esters, fatty alcohols, glycerol esters, glycol esters metallic stearates and ricinoleates, paraffin waxes, synthetic waxes, polyethylene waxes, modified polyethylene waxes, vinyl ethers, triglycerides, wax acid, and wax esters; (6) from about 2 to about 9 parts by weight of at least one surfactant selected from: polyoxyethylene(20) sorbitan monooleate, the mono and diglycerides of fat-forming fatty acids, a nonylphenoxy polyoxyethylene ethanol containing 4 to 5 moles of ethoxylate, glycerol monooleate, sorbitan monooleate, polyoxyethylene(9)monooleate, α-alkyl-, α-alkenyl and α-alkylaryl-omega-hydroxypoly(oxyethylene) comprised of at least one of α-(2,4,6-triisobutylphenol)-omega-hydroxypoly(oxyethylene), α-(Z)-9-octadecenyl-omega-hydroxypoly (oxyethylene), and α-alkyl($C_{16}$-$C_{18}$)-omega-hydroxypoly(oxyethylene) α-alkyl-omega-hydroxypoly(oxyethylene) derived from ethylene oxide and $C_{11}$-$C_{15}$ straight chain secondary alcohols, n-alkylsulfonate where said alkyl group has 10-18 carbon atoms, α-di-sec-butylphenyl-omega-hydroxypoly(oxyethylene) derived from ethylene oxide and di-sec-butylphenol, α-dodecyl-omega-hydroxypoly (oxyethylene) mixture of dihydrogen phosphate and monohydrogen phosphate esters derived from esterification of the product of ethylene oxide and n-dodecyl alcohol, α-(p-dodecylphenyl)-omega-hydroxypoly(oxyethylene) derived from ethylene oxide and dodecylphenol α-(p-nonylphenyl)-omega-hydroxypoly(oxyethylene) mixture of dihydrogen phosphate and monohydrogen phosphate esters derived from esterification of α-(p-nonylphenyl)-omega-hydroxypoly(oxyethylene) derived from condensation of nonylphenol and ethylene oxide, α-(p-nonylphenyl)-omega-hydroxypoly(oxyethylene) sulfate, ammonium and sodium salts where said nonyl group is a propylene trimer isomer and said poly(oxyethylene) content averages about 4 moles, poly(oxypropylene) block polymer with poly(oxyethylene) having an average molecular weight of about 11,000 to about 18,000, polyoxyethylene(20)sorbitan monostearate, polyoxyethylene (20) sorbitan tristearate, polyoxyethylene(20) sorbitan monooleate, polyoxyethylene(20) sorbitan trioleate, sodium n-alkyl-benzene-sulfonate where said alkyl group contains an average of about 10 to about 16 carbon atoms, sorbitan monopalmitate, sorbitan monostearate, sorbitan trioleate, sorbitan tristearate, α-]p-(1,1,3,3,-tetramethyl-butyl)phenyl]-omega-hydroxy poly(oxyethylene) derived from ethylene oxide and p-(1,1,3,3,-tetramethyl-butyl)phenol, tetrasodium N-(1,2-dicarboxyethyl)-N-octadecyl-sulfosuccinamate, and α-tridecyl-omega-hydroxypoly(oxyethylene) mixture of dihydrogen phosphate and monohydrogen phosphate esters derived from esterification of the product of ethylene oxide and tridecyl alcohol, (7) and from about 0.1 to about 0.6 part by weight of a slip-antiblock agent selected from at least one of the group consisting of ethylene-N,N'-bis-oleamide, hydrofol glyceride, hydrogenated fish oil, calcium ricinoleate and fatty acid amides selected from amides with aliphatic hydrocarbon chains containing in the range of about 16 to 40 even numbered carbon atoms, said hydrocarbon chains being saturated or partly unsaturated with 1 to 2 carbon-to-carbon double bonds of unsaturation.

2. The compounded polyvinyl chloride film of claim 1 characterized when having a thickness of about 0.7 mils by an Elmendorf tear resistance in the range of about 20 to about 200 grams/mil according to ASTM No. D-1922-61T, a coefficient of friction (film against metal) of about 0.2 to about 2.0 according to ASTM No. D-1894-63, a water vapor transmission rate (WVTR) at 37.8° C and a relative humidity of about 90 percent generally in the range of about 15 to about 50g/100 $in^2$/24 hrs according to ASTM No. E-96-66, Method E, and an oxygen transmission generally in the range of about 350 to about 1200 cc/100 $in^2$/24 hrs/1 atm according to ASTM No. D-1434-63.

3. The compounded polyvinyl chloride film of claim 1 where said lubricants are selected from paraffin oils having a solidification point in the range of about 50° C to about 70° C, natural paraffins having a solidification point in the range of about 50° C to about 70° C, synthetic paraffins having a solidification point in the range of about 50° C to about 100° C, palmitic acid, stearic acid, arachidic acid, behenic acid, hydroxystearic acid, tallow, fish oil fatty acids generally of the palmittic/-stearic acid mixture-type, palmityl alcohol and stearyl alcohol, neutral lead stearate, calcium stearate, zinc stearate, tin-II-ricinoleate, tin-II-octoate, cetyl palmitate, myricyl palmitate, stearyl stearate, ethyl stearate, n-butyl stearate, n-octyl stearate, glyceryl monostearate, glyceryl monooleate, glyceryl monoricinoleate, acetylglyceryl monoricinoleate, acetylglyceryl monostearate, diethylene glycol monolaurate, glycerine tripalmitate, glyceryl tristearate, glyceryl tri-12-hydroxys-tearate, stearamide and ethylene diamine distearate.

4. The compounded polyvinyl chloride film of claim 1 where said polyvinyl chloride has a particle size range from about 75 to about 200 microns, an inherent viscosity in the range of about 0.5 to about 1.4 as determined in cyclohexanone according to ASTM No. D-1243-66 and an apparent bulk density in the range of about 9 to about 51 pounds per cubic feet.

5. The compounded polyvinyl chloride film of claim 4 where said lubricants are selected from palmityl and stearyl esters of oleic, caprylic, lauric, palmitic, stearic, myristic acids; behenamide, stearamide, oleamide, erucamide; stearic acid, palmitic acid, tallow fish oil acids, lauric acid, caprylic acid, myristic acid, ricinoleic acid, hydroxystearic acid, behenic acid, arachidic acid; lead, calcium, zinc stearates, tin octoate; polyethylene waxes and modified polyethylene waxes.

6. The compounded polyvinyl chloride film of claim 5 wher said epoxidized linseed and soyabean oils are characterized by containing about 4 to about 10 percent oxirane oxygen, said surfactants are selected from mono and diglycerides of fat-forming acids, where such fat-forming fatty acids are selected from lauric, palmitic, stearic, oleic, linoleic and linolenic acids; nonylphenoxy polyoxyethylene ethanol and polyoxyethylene(9) monooleate and said slip-antiblock agent is ethylene-N,N'-bis-oleamide.

7. The compounded polyvinyl chloride film of claim 4 where said polyvinyl chloride is compounded with a plasticizer selected from at least one of di(2-ethylhexyl)adipate, di(2-ethylhexyl)azelate, di(n-hexyl)azelate, and at least one of epoxidized linseed oil and epoxidized soyabean oil; a silica pigment having a silica content of at least about 98 weight percent $SiO_2$; a stabilizer as a mixture of zinc stearate and calcium stearate; tris-nonyl-phenyl phosphite chelator; a surfactant mixture polyoxyethylene(9)monooleate and glycerol mono fatty acid ester; and ethylene-N,N'-bis-oleamide as a slip-anti-blocking agent and a lubricant system selected from stearic acid, low molecular weight polyethylene or partially oxidized low molecular weight polyethylene, where the weight ratio of ethylene-N,N'-bis-oleamide to plasticizer is less than about 0.017.

* * * * *